(No Model.)

E. C. WENDEBORN.
CORN AND COTTON PLANTER.

No. 597,925. Patented Jan. 25, 1898.

Witnesses.
Franck L. Ouraud
O. L. Coombs

Inventor
Ernest C. Wendeborn,
by Fred E. Tasker,
his Attorney.

THE NORRIS PETERS CO., PHOTO-LITHO., WASHINGTON, D. C.

UNITED STATES PATENT OFFICE.

ERNEST CHARLES WENDEBORN, OF WILLIAMSON COUNTY, TEXAS, ASSIGNOR OF TWO-THIRDS TO JESSE W. DORRIS AND ABRAHAM ALEXANDER, OF TAYLOR, TEXAS.

CORN AND COTTON PLANTER.

SPECIFICATION forming part of Letters Patent No. 597,925, dated January 25, 1898.

Application filed August 3, 1897. Serial No. 646,859. (No model.)

*To all whom it may concern:*

Be it known that I, ERNEST CHARLES WENDEBORN, a citizen of the United States, residing in the county of Williamson and State of Texas, have invented certain new and useful Improvements in Corn and Cotton Planters; and I do hereby declare the following to be a full, clear, and exact description of the invention, such as will enable others skilled in the art to which it appertains to make and use the same.

My invention relates to corn and cotton planters, and its object is to provide the same with a sweep or plow which travels in front of the seeder or planter mechanism to open a furrow, and so constructed that when an obstruction is met with which would be liable to injure or break the sweep the latter will give or yield, so as to allow it to pass over the same without injury.

The invention consists in the novel construction and combination of parts hereinafter fully described and claimed.

Figure 1:
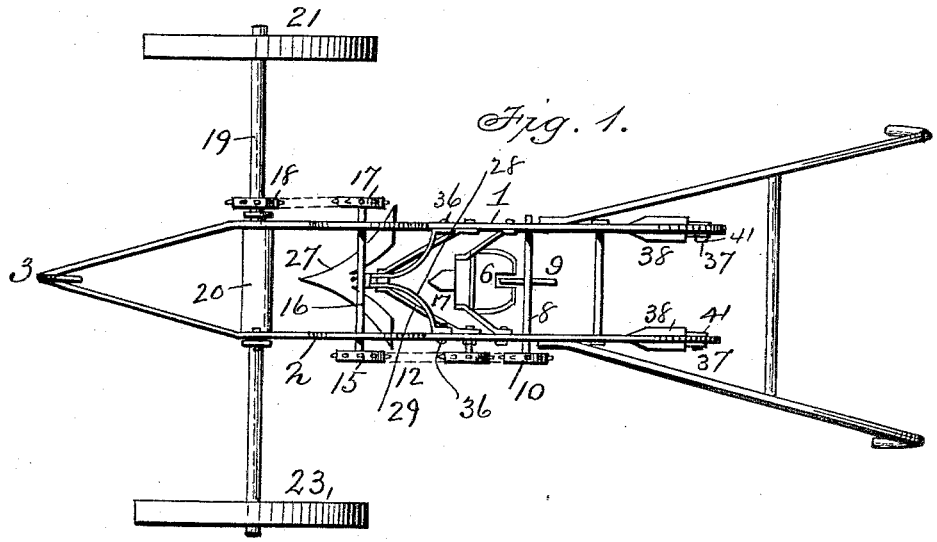
Figure 2:
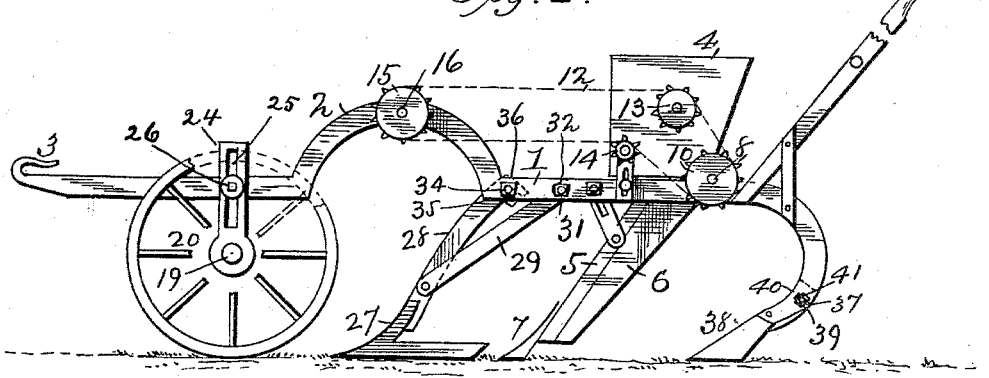
Figures 3, 4, 5:
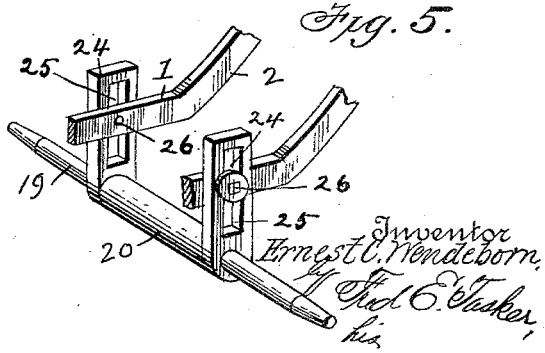

In the accompanying drawings, Figure 1 is a plan view of a planter with my improvements applied thereto. Fig. 2 is a side elevation of the same. Fig. 3 is a detail perspective view of one of the standards to which the sweep is attached. Fig. 4 is a detail view showing the manner of adjustably securing the brace-bars to the side bars. Fig. 5 is a perspective view showing the manner of adjustably connecting the axle of the supporting-wheels with the side bars.

In the said drawings the reference-numeral 1 designates the side bars, upwardly curved intermediate their ends, as seen at 2, and the front ends converging inwardly and connected together at 3.

The numeral 4 designates the seed hopper or box provided with an inclined standard 5, a seed-spout 6, and a furrow-opening plow 7. In rear of the seedbox is a transverse shaft 8, provided with fingers 9, projecting thereinto, and at one end having a sprocket-wheel 10, connected by sprocket-chain 12 with sprocket-wheel 13, idler sprocket-wheel 14, and sprocket-wheel 15. The shaft 16 of wheel 15 at the opposite end is provided with a sprocket-wheel 17, which is connected with a sprocket-wheel 18, secured to the axle 19. The planter may be of any ordinary or suitable construction and forms no part of my invention. The axle 19 passes through a tube 20, which forms a bearing therefor, and at one end is provided with a loose wheel 21 and a fixed wheel 23. Formed with said tube at each end is a standard 24, having a slot 25, through which passes an adjustable bolt 26, connected with the side bar. By this construction the bearing and axle may be adjusted vertically.

Located in front of the seedbox is a sweep or plow 27, which travels in advance of the seed-spout and its plow. This sweep is bolted to the ends of two inwardly-curved standards 28, which are pivoted intermediate their ends to two adjustable brace-bars 29, the upper ends of which extend back horizontally and are formed with slots 30, through which pass bolts 31, by which they are adjustably secured to the side bars 1. By loosening the nuts 32 of said bolts the brace-bars can be laterally adjusted to vary the height of the standards with which the sweep is connected. The upper ends of these standards are formed with open slots 34, with which are connected screw-bolts 35, secured to the side bars 1. These bolts are provided with nuts 36, which clamp the standards to the side bars with sufficient friction to hold them under ordinary circumstances, but which will allow them to be disengaged when an obstruction liable to damage or break the sweep is encountered.

The rear ends of the side bars are curved downwardly and provided with pivoted bars 37, having coverers 38 at the lower end. These bars are formed with open slots 39, similar to the sweep-standards, which engage with screw-bolts 40, secured to said bars and provided with nuts 41.

In practice the sweep travels in front of the planter, opening a furrow, the curved portion of the side bars forming a space for any trash which may accumulate on the sweep. In case a rock or other obstruction liable to injure the sweep is met with the friction between the nuts and the slotted end of the standard is overcome, allowing the latter to turn backward on the pivots, so that the sweep will pass over the obstruction.

The curving of the side bars is an important feature of the plow, as it forms a space for the trash to accumulate and thus prevent choking or clogging. The idler-sprocket 14 is also important, as it serves to hold the sprocket-chain up out of the way of the trash cut by the sweep.

Having thus fully described my invention, what I claim as new, and desire to secure by Letters Patent, is—

1. The combination in a planter of the character described, of the side bars formed with upwardly-extending curves intermediate the ends, the axle provided with upwardly-extending slotted standards, the bolts passing therethrough and secured to the front ends of said side bars, the seedbox and the sweep adjustably secured to the side bars and located to the rear of the curved portions thereof, substantially as described.

2. The combination in a planter of the character described, of the side bars having upwardly-extending curves intermediate the ends, the axle, the slotted standards, the bolts passing therethrough and secured to said side bars, the sweep located below the curved portions of the side bars, the standards to which the sweep is secured provided with open slots at the upper ends, the screw-bolts engaging with said slots, the brace-bars pivoted to said standards, formed with horizontal slots at the upper ends, and the bolts passing therethrough and through the said side bars, substantially as specified.

In testimony whereof I affix my signature in presence of two witnesses.

ERNEST CHARLES WENDEBORN.

Witnesses:
H. E. WILLSON,
N. W. FOSTER.